United States Patent
Allan et al.

(10) Patent No.: US 10,176,458 B2
(45) Date of Patent: Jan. 8, 2019

(54) NATURAL LANGUAGE PROCESSING BASED MONITORING AND RESOLUTION OF OPEN TECHNICAL ISSUES

(71) Applicant: International Business Machines Corporation, Armonk, NY (US)

(72) Inventors: Robert Allan, Raleigh, NC (US); Constance E. Smith, New York, NY (US); Thembani Togwe, Lenexa, KS (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 445 days.

(21) Appl. No.: 14/959,199

(22) Filed: Dec. 4, 2015

(65) Prior Publication Data

US 2017/0161683 A1 Jun. 8, 2017

(51) Int. Cl.
*G06Q 10/10* (2012.01)
*H04L 12/58* (2006.01)
(Continued)

(52) U.S. Cl.
CPC ..... *G06Q 10/103* (2013.01); *G06F 17/30424* (2013.01); *G06Q 10/06398* (2013.01);
(Continued)

(58) Field of Classification Search
None
See application file for complete search history.

(56) References Cited

U.S. PATENT DOCUMENTS

| 7,310,625 B2 | 12/2007 | Wu |
| 8,027,944 B1 | 9/2011 | Heidenreich et al. |

(Continued)

FOREIGN PATENT DOCUMENTS

WO 0125910 A1 4/2001

OTHER PUBLICATIONS

Freelancer; "Freelancers for Hire—p. 1"; https://www.freelancer.in/freelancers/skills/Prestashop-Joomla-CMS-SQL-php-website_management/1/; Oct. 15, 2015; 4 pages.
(Continued)

*Primary Examiner* — Thomas L Mansfield
*Assistant Examiner* — Amanda Gurski
(74) *Attorney, Agent, or Firm* — Cantor Colburn LLP

(57) ABSTRACT

Aspects include a method, a system and a computer program product. The method includes identifying, on an electronic platform providing for an exchange of messages among multiple participants, at least one open issue to be resolved. Data is collected from the exchanged messages to determine a participation interaction parameter and a solution quality parameter associated with at least one open issue. The participation interaction parameter includes an accountability dynamic factor and collaboration dynamic factor and the solution quality parameter includes a velocity factor, a dormancy factor, and an extinction factor. When a sum of the participation interaction parameter and the solution quality parameter is below a threshold value, at least one open issue participant is invited to the electronic platform. It is also determined when the at least one open issue becomes a closed issue.

13 Claims, 7 Drawing Sheets

(51) Int. Cl.
    *G06F 17/30*     (2006.01)
    *H04L 29/08*     (2006.01)
    *G06Q 10/06*     (2012.01)
    *H04L 29/06*     (2006.01)

(52) U.S. Cl.
    CPC .......... *H04L 51/046* (2013.01); *H04L 65/403* (2013.01); *H04L 67/22* (2013.01); *H04L 67/24* (2013.01)

(56) References Cited

U.S. PATENT DOCUMENTS

| | | |
|---|---|---|
| 8,626,545 B2 | 1/2014 | Van Pelt et al. |
| 2007/0160970 A1 | 7/2007 | Kaplan |
| 2013/0096968 A1* | 4/2013 | Van Pelt ........ G06Q 10/063112 |
| | | 705/7.13 |
| 2014/0006292 A1* | 1/2014 | Kozlovsky ........... G06Q 30/016 |
| | | 705/304 |
| 2017/0039505 A1* | 2/2017 | Prabhakara .... G06Q 10/063118 |

OTHER PUBLICATIONS

Freelancer; "sanjay2004 Smartinfosys—Empowering People & Business"; https://www.freelancer.in/u/sanjay2004.html; Oct. 15, 2015; 6 pages.

List of IBM Patents or Patent Applications Treated as Related (Appendix P), Filed Dec. 4, 2015, 2 pages.

Robert Allan, et al., Pending U.S. Appl. No. 15/067,465 entitled "Identifying Participants and Measuring Performance for Online Collaborations" filed with the U.S. patent and Trademark Office filed Mar. 11, 2016, \* cited by examiner

US 10,176,458 B2

NATURAL LANGUAGE PROCESSING BASED MONITORING AND RESOLUTION OF OPEN TECHNICAL ISSUES

BACKGROUND

The present invention relates generally to system and method for collaborative problem solving and, more specifically, to a system and method for identifying potential participants to assist in an online collaboration and for the measurement of performance of the participants in an online collaboration.

Collaborative problem solving involves selecting personnel having the appropriate skills or experience for the purpose of accomplishing a goal. The use of online collaboration allows for team members to be assembled even when some or all or the participants are not geographically co-located. To identify team members for the online collaboration, team leaders or project managers often rely on networking, personal relationships and recommendations from their peers when determining who to invite to participate. Once the proper individuals are identified and join the team, the participants can collaborate together to find solutions that resolve the open issue.

SUMMARY

Embodiments include a method, system, and computer program product for identifying participants and measuring performance in an online collaboration. A method includes identifying, on an electronic platform providing for an exchange of messages among multiple participants, at least one open issue to be resolved. Data is collected from the exchanged messages to determine a participation interaction parameter and a solution quality parameter associated with at least one open issue. The participation interaction parameter includes an accountability dynamic factor and collaboration dynamic factor and the solution quality parameter includes a velocity factor, a dormancy factor, and an extinction factor. When a sum of the participation interaction parameter and the solution quality parameter is below a threshold value, at least one open issue participant is invited to the electronic platform. It is also determined when the at least one open issue becomes a closed issue.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
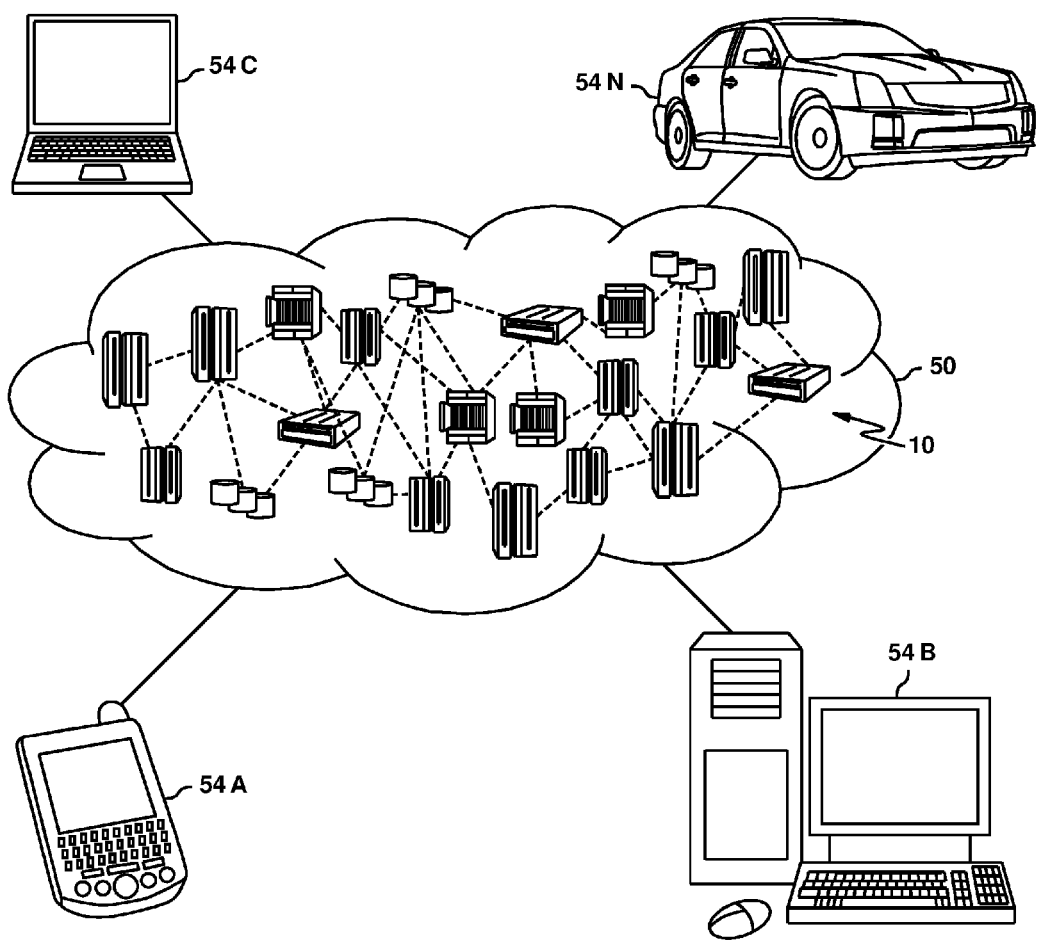
FIG. 1 depicts a cloud computing environment according to an embodiment of the present invention.

Embodiments of this disclosure provide for a system and method that facilitates the identification of participants in an online collaboration of an open issue. Embodiments of this disclosure provide for the monitoring of participants performance in an online collaboration of an open issue. Still further embodiments of this disclosure provide for the automatic identification that a new participant is desired based on the performance of the participants in an online collaboration and the invitation of a new participant. Embodiments of this disclosure provide for the recalling of past performance metrics to facilitate for new resource/issue matching. Embodiments of this disclosure further provide for a more direct, streamlined, and automated solution to identify appropriate individuals to solve a specific problem. Still further embodiments utilize past performance metrics to facilitate new resource matching with open issues.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, wearable computing devices and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
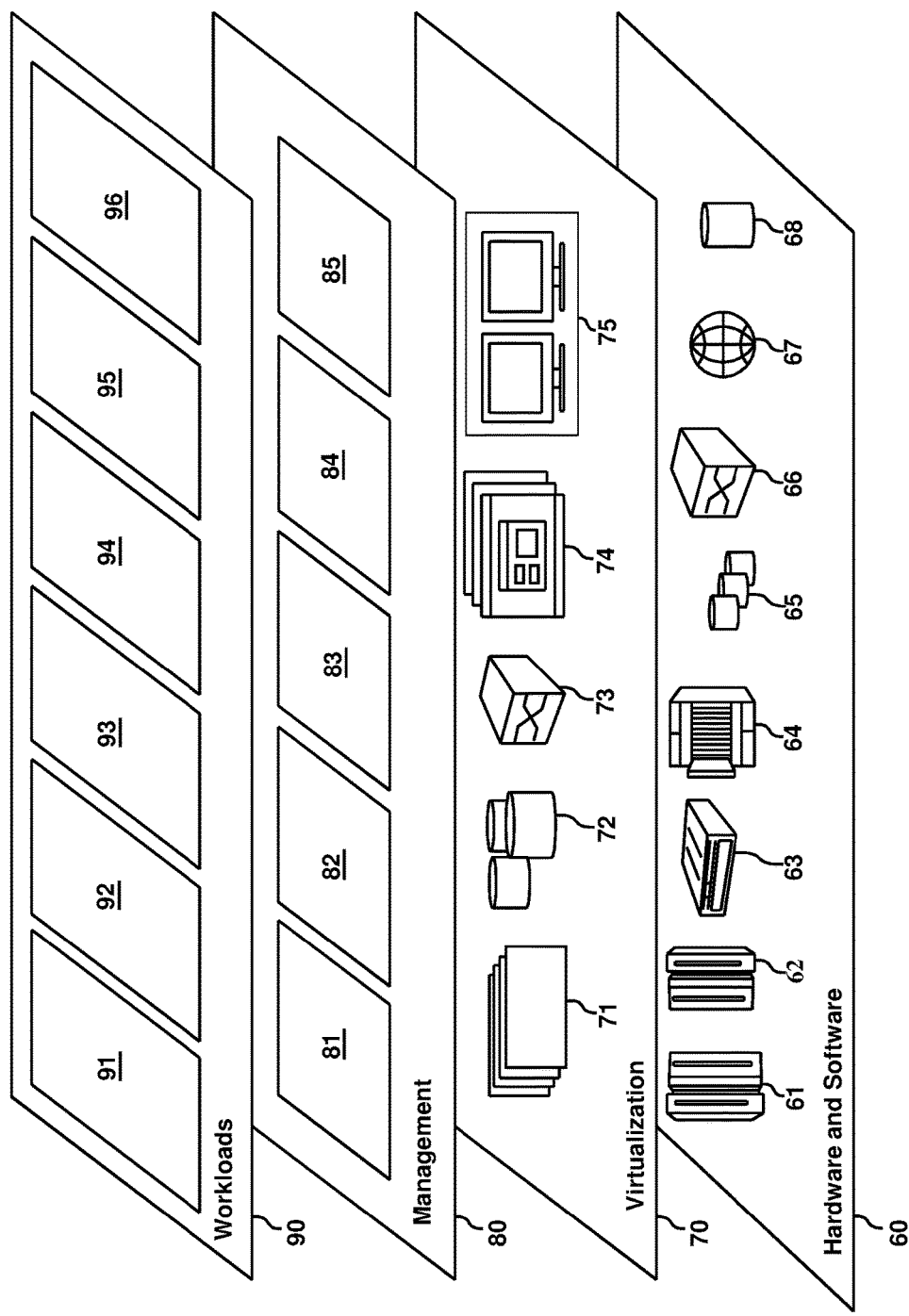
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and online collaboration management system 96. The online collaboration management system 96 may include, or cooperate with, an electronic platform for exchange of messages among multiple participants. As discussed in more detail herein, the online collaboration management system 96 provides for the identification of potential team members based at least partially on the individual's history in resolving open issues and for measuring the performance of each individual based at least in part on the exchange of messages among the multiple participants of the collaboration.

Figure 3:
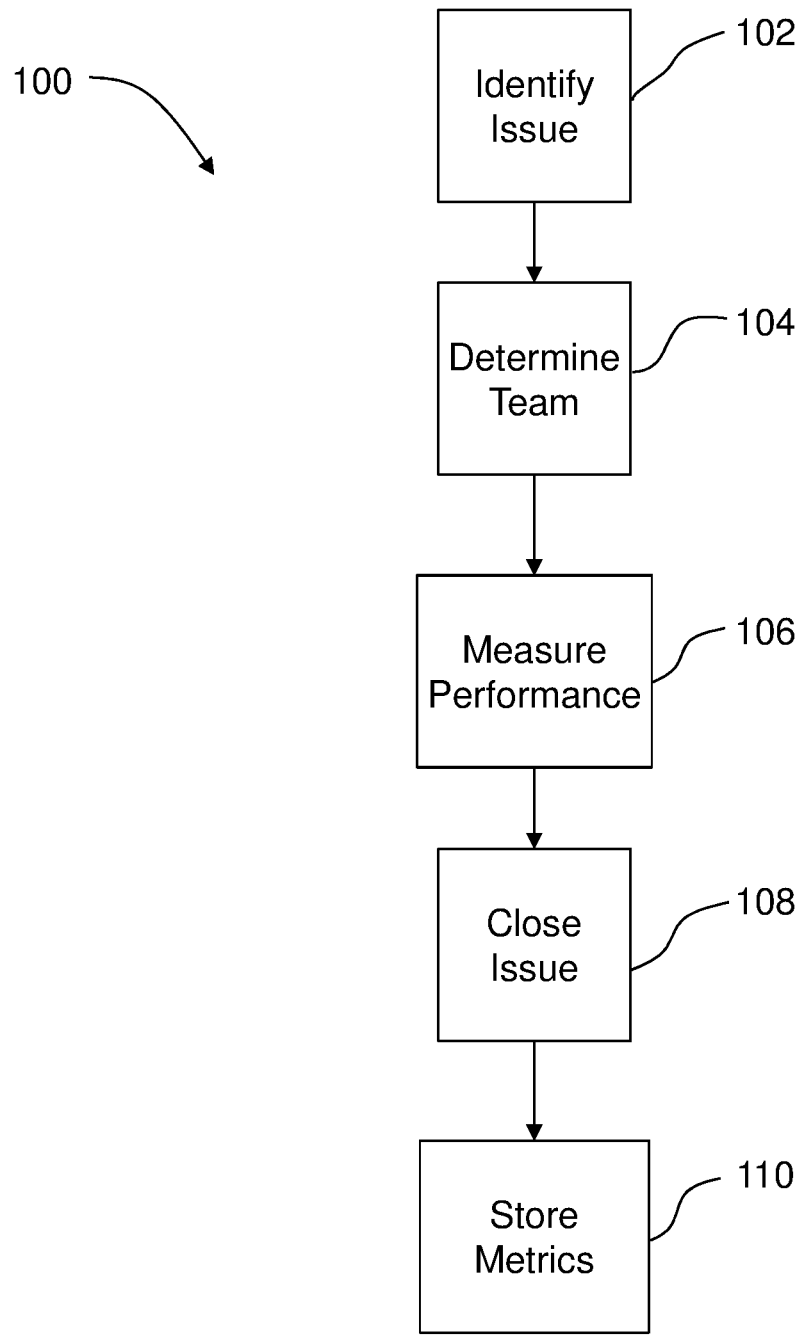
FIG. 3 depicts a flow diagram of a method for implementing some or all aspects of the system, according to some embodiments of this disclosure.

Referring now to FIG. 3, a method 100 is shown for identifying participants and measuring performance of a group of individual's participating in an online collaboration to resolve an open issue. The method 100 starts in block 102 where the open issue is identified. The method 100 then proceeds to block 104 where potential participants are identified and invited to join the collaboration. As discussed in more detail herein, in some embodiments, the identification of the participants is based on the individuals technical skills (e.g. do they have the prerequisite knowledge and skills for resolving this issue) along with performance metrics for expert interaction parameter (accountability and collaboration dynamics) and an expert solution quality parameter (velocity, dormancy, extinction). In some embodiments, these metrics may then be used to determine a composite participant score that is used to rank potential participants in the online collaboration.

As used herein, the phrase "participant interaction" is a parameter comprised of one or more metrics, such as an accountability factor and collaboration dynamics factor for example, that provide an indication of how well the individual participates in online collaborations. In an embodiment, the accountability factor is an indication of how accountable the participant will be to the online collaboration. In one embodiment, the accountability factor is a count or sum of the number of open issues the individual has been invited to participate in solving. In another embodiment, the accountability factor is a count or sum of the number of times the participant participates in the online collaborations that they are a member. In an embodiment, the collaboration dynamics factor is an indication of how well the individual worked with other team members. In one embodiment, the collaboration dynamics factor is a count or sum of the number of responses the with a collaboration session. In another embodiment, the collaboration dynamics factor is a ratio of the count or sum of the responses by the participant being measured compared to the count or sum of the responses made by other participants. In another embodiment, the collaborative dynamics factor may be based on the language used by the participant during previous collaboration sessions. It should be appreciated that in some embodiments, the factor scores may be unitized value (e.g. a number of times they participated per collaboration rather than a total count) or an averaged value.

As used herein, the phrase "solution quality" is a parameter comprised of one or more metrics, such as velocity, dormancy and extinction for example, that indicate how well the individual has performed in solving open issues. In an embodiment, the velocity factor is the lead time to resolving an open issue, such as the average time to close an open issue. In an embodiment, the dormancy factor is an indication of whether then open issues were actually solved as the issue reoccurs within a predetermined time period. For example, the dormancy factor may define the number of issues where the individual indicated a solution was found, but the issue reoccurred within a predetermined time period. In an embodiment, the extinction factor is an indication of the number of open issues that were resolved and did not reoccur within the predetermined time period. In one embodiment, the predetermined time period may be a fixed time period (e.g. one week or one year). In another embodiment, the time period may be based on the issue involved. For example, certain CMOS memory devices may have a life span of one-year. When solution involving these devices does not reoccur within the one-year life span, the extinct factor increases. However, when a problem does reoccur within the one-year period, the dormancy factor increases. It should be appreciated that in some embodiments, the dormancy factor may be a negative number. In these embodiments, rather than increasing, the dormancy factor may decrease (e.g. become more negative).

It should be appreciated that the participant interaction and solution quality parameters are based on historical data. In an embodiment, the parameters used in identifying participants in an online collaboration may be weighted such that some parameters may more heavily influence the ranking of the potential participants than other parameters.

Once the team or online collaboration group has been determined, the method 100 proceeds to block 106 where the performance of the individuals in the online collaboration group is monitored and measured. In an embodiment, the online collaboration management system 96 monitors the electronic communications between the team members and records a metric score in response to a trigger event. For example, if during an electronic communication an individual behaves in a positive manner or in accordance with the organization's core values, the system 96 may record a positive score for the individual in the collaboration dynamics parameter. In an embodiment, the individual may also receive a negative score for collaboration dynamics parameter when behaving in an undesirable manner.

The method 100 then proceeds to block 108 when the open issue is resolved or closed, such as when a solution to the issue is found. In one embodiment, the system 96 automatically detects the closure of the open issue from the monitoring of the electronic communications between the participants of the online collaboration. The method 100 then proceeds to block 110 where the measured parameters are stored and become part of each participant's metrics that may be used in determining their suitability for future collaborative efforts.

Figure 4:
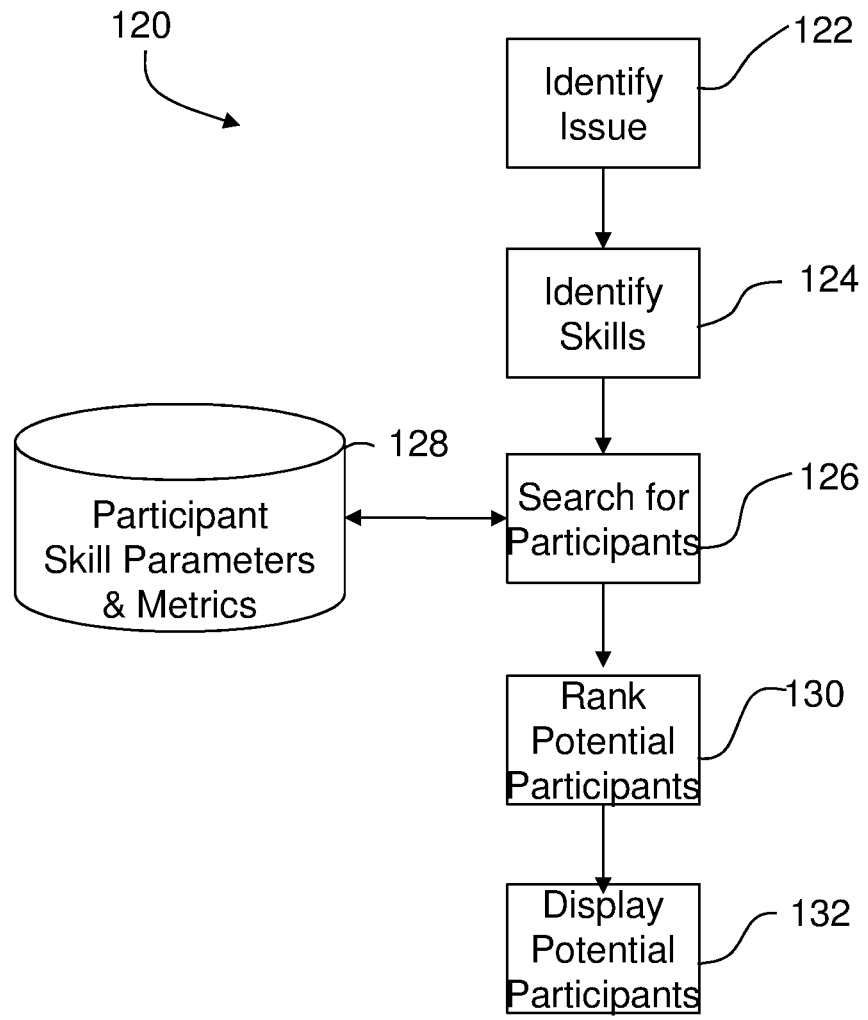
FIG. 4 depicts a flow diagram of another method for implementing some or all aspects of the system, according to some embodiments of this disclosure.

Referring now to FIG. 4, a method 120 is shown for identifying participants in an online collaboration. The method 120 begins in block 122 with the identification of an open issue. The method 120 then proceeds to block 124 where the skills are identified, such as by the organizer of the online collaboration, that are believed desirable for resolving the open issue. These skills could include technical skills (e.g. object oriented programming, mechanical engineering, sourcing, mind mapping moderator, etc.) as well as interpersonal skills (follows through on commitments, works well with others, etc.). The method then proceeds to block 126 where the search for participants is initiated. The skills could be automatically identified by the system based on the issue e.g if a Quality Management Enterprise Resource Planning (ERP) system detects an out of specification performance for a particular commodity such as Memory DIMMs, then the system could determine that the needed skills are Quality+Memory.

Figure 5:
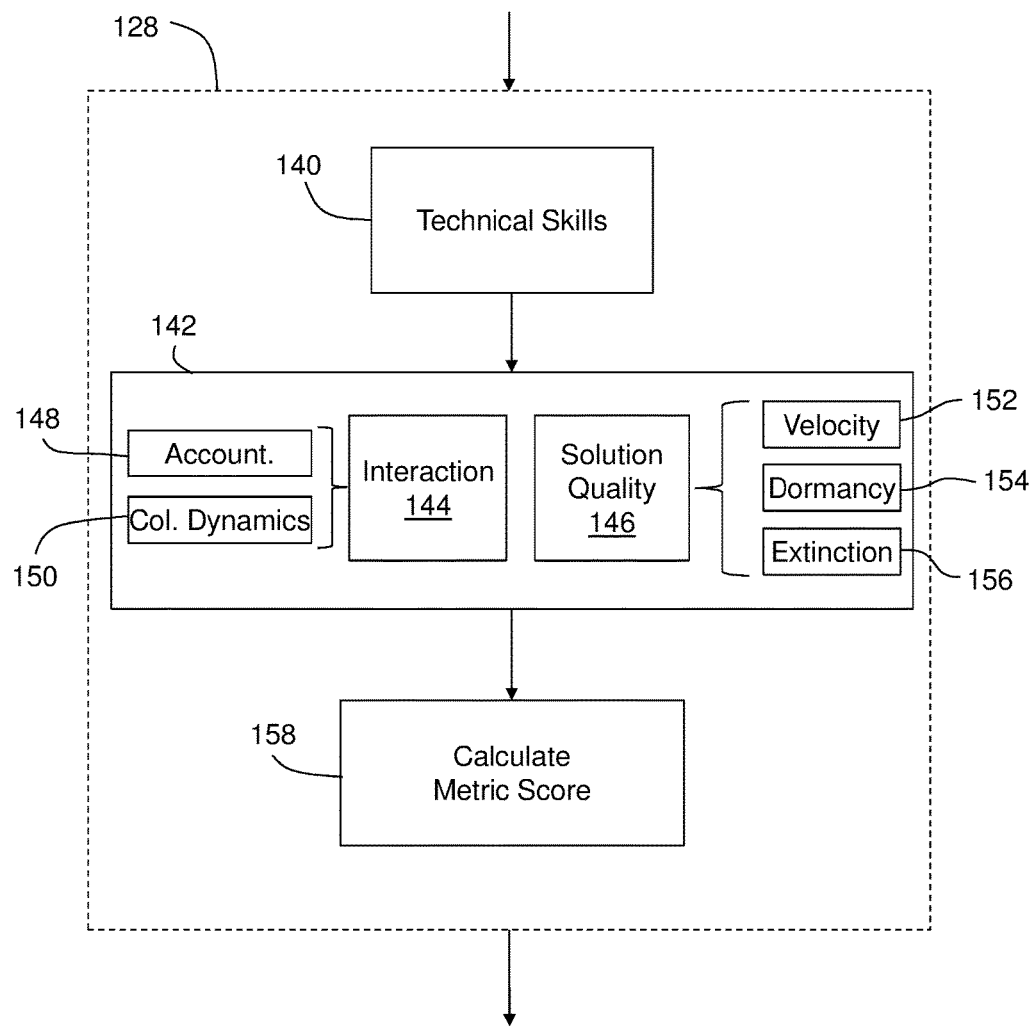
FIG. 5 depicts a flow diagram for determining a potential participant, according to some embodiments of this disclosure.

In an embodiment, the block 126 initiates a search of a database system 128 that includes historical data of available participants for the online collaboration. This historical data may include technical skills, solution quality parameters and participation interaction parameters. Referring now to FIG. 5 one embodiment is shown of the database system 128 for identifying potential participants for the online collaboration. In this embodiment, first the technical skills are used in block 140 to filter to the individuals within the database to identify those individuals who have the appropriate technical skills to address the open issue to define a database subset of individuals. Next the method 120 proceeds to block 142 where the participant or expert metrics are determined for each of the individuals in the identified database subset. In one embodiment, block 142 includes a query of participant interaction parameter 144 and solution quality parameter 146. In an embodiment, the participant interaction parameter 144 includes an accountability factor 148 and a collaboration dynamics factor 150. In an embodiment, the solution quality parameter 146 is comprised of a velocity factor 152, a dormancy factor 154 and an extinction factor 156. Another approach could include individuals who have worked on similar problems before, for example the same category of problem issue, same part number or related part number (e.g. a substitute part number).

In one embodiment, once the parameters for each individual within the database subset group have been retrieved, a composite score is determined in block 158 for each individual within the database subset group. This composite score is a sum of the individual's participation interaction parameter and solution quality parameter. In another embodiment, the composite score is determined on a weighted basis, such as Score=aA+bC+cV+dD+eE. Where A is the accountability factor, C is the collaboration dynamics factor, V is the velocity factor, D is the dormancy factor and E is the Extinction factor. The coefficients a, b, c, d and e are weighting parameters. In one embodiment, the weighting parameters may be set subjectively or heuristically by system administrators. In another embodiment, the coefficients may be determined by the person organizing the online collaboration. For example, where an open issue has high visibility and will be closely watched by senior management, the organizer may identify that the skills required is more heavily weighted toward individuals with better refined accountability and collaboration dynamics factors.

Referring back to FIG. 4, once the subset of individuals from the database has been generated, the method 120 proceeds to block 130 where the potential participants are arranged in a ranked order. In the exemplary embodiment, the potential participants are ranked by the composite score (determined in block 158), so that the individuals with the highest composite score are ranked higher in the listing. The ranked list of potential participants is then displayed in block 132 to the person organizing the online collaboration. In another embodiment, the system 96 automatically transmits an invitation to the potential participant with the highest composite score. If the highest ranked potential participant declines to be involved, the system 96 then automatically proceeds to the next highest ranked person in the ranked list. This continues until an invitation to participate is accepted.

In one embodiment, the ranking of potential participants in block 130 may include other factors such as availability of the participant. For example, if it is determined that the potential participant is already involved in ten other collaborations then that participant may be ranked lower in the potential participants list. Further, the system may base the ranking adjustment based at least in part on the status of the other collaborations. When the other collaborations have a status that indicates they are close to being resolved, then the ranking adjustment may be small. In an embodiment, the resolution of potential workload issues for potential participants may include ranking the problems being resolved by the various collaborative teams with respect to business importance. For those issues where the person is participating but there is still an opportunity to delegate their responsibilities to another potential participant, the new potential participant may be invited to join the collaborative team. When the new potential participant accepts, they will replace the previous person. In this way, the priorities of the business may be addressed without de-resourcing less urgent collaborations. In an embodiment, when a workload issue cannot be resolved by the system or potential participant assignment of other resources by the system, then a management escalation process may be initiated.

Figure 6:
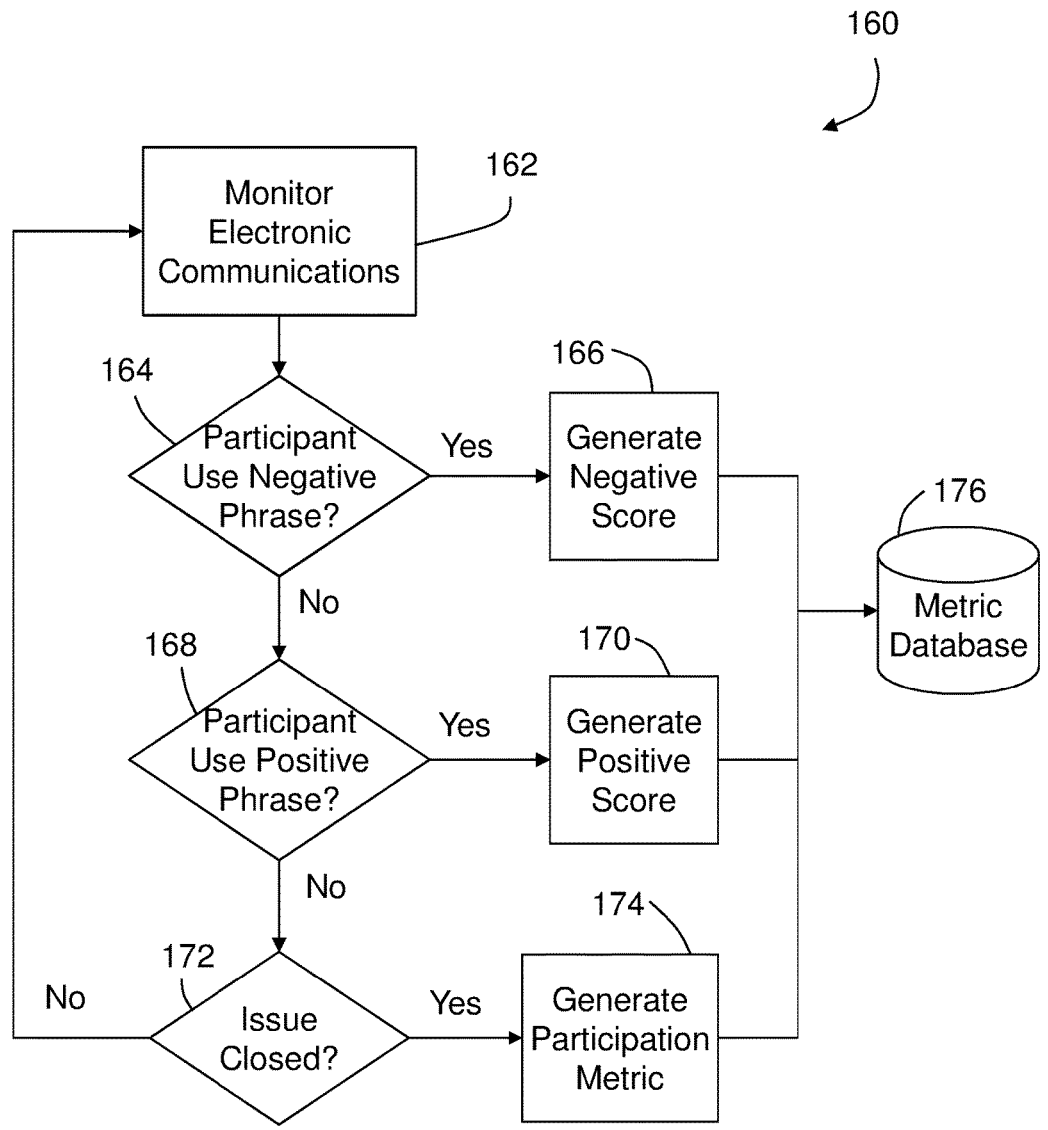
FIG. 6 depicts a flow diagram for determining a participants performance metric and whether an issue is closed, according to some embodiments of this disclosure.

Referring now to FIG. 6, another method 160 is shown for measuring the performance of the participants in the online collaboration. The method 160 starts in block 162 by monitoring the electronic communications of the participants. In one embodiment, the electronic communications are all in machine-encoded text format, such as in a chat or e-mail communication for example. In other embodiments, the electronic communications may include voice or video electronic communications. In one embodiment, the monitoring of electronic communications includes keyword or key phrase identification where the keywords or phrases are associated with either the performance of the participant or the closure of the issue.

The method 160 proceeds to query block 164 were it is determined if the participant used a negative phrase in the electronic communications. As used herein, a "negative phrase" means the use of language that is considered undesirable or unconducive with working in a team collaboration. It should be appreciated that what language is considered undesirable is subjective and may vary from group to group or between organizations. In one embodiment, the definition of negative phrases may be defined by the person organizing the online collaboration. In another embodiment, the definition of negative phrases may be defined by an organization's values (e.g. corporate values). In still another embodiment, the definition of the negative phrases may be determined by the participants to the online collaboration.

When the query block 164 returns a positive (e.g. a negative phrase was used), then the method 160 proceeds to block 166 where a negative score is generated for the participant who used the negative phrase. In an embodiment, the negative score may be applied to the dynamic collaboration factor for example. The value of the negative score may depend on the phrase used. Once the score has been assigned, the value is stored in block 176.

When the query block 164 returns a negative (e.g. no negative phases used), then method 160 proceeds to query block 168 where it is determined whether a positive phrase was used (e.g. "Thank you"). As with the negative phrases, the definition of the positive phrases is subjective and may vary from group to group or organization to organization. In an embodiment, the definition of the positive phrases may be defined by the person organizing the online collaboration. In another embodiment, the definition of the positive phrases may be defined by an organization's values (e.g. corporate values). In still another embodiment, the definition of the positive phrases may be determined by the participants to the online collaboration.

When the query block 168 returns a positive, the method 160 proceeds to block 170 where a positive score is generated for the participant who used the phrase. In an embodiment, the positive score may be applied to the dynamic collaboration factor for example. The value of the positive score may depend on the phrase used. Once the score has been assigned, the value is stored in block 176.

When the query block 168 returns a negative, the method 160 proceeds to block 172 where it is determined if the open issue has been closed (e.g. the issue has been resolved). The determination of the closure of the issue may be determined through the monitoring of the electronic communications and the identification of keywords or key phrases that are associated with a solution to the issue. When query block 172 returns a negative, the method 160 loops back to block 162. When the query block 172 returns a positive, meaning the issue is closed, the method 160 proceeds to block 174 where a participation metric is generated. For example, the method 160 may generate a collaboration dynamics factor for each participant in the online collaboration. The method 160 may also generate a velocity factor data. The generated metric data is then stored in block 176.

In one embodiment, the method 160 further determines whether a participant attends online collaboration sessions and determines an accountability factor based at least partially on the attendance in the session. In other embodiments, the accountability factor may include how active a participant is during the session, such as by counting the number of responses or the number of words entered.

In another embodiment, the method 160 may further determine the accountability factor by determining how much progress a participant is making to actions that they have been assigned. The method 160 may use the analysis of the electronic communications to determine when a participant has been assigned an action and then automatically transmit a message to them on a periodic or aperiodic basis for an update on a status of the action.

In an embodiment, the determination of the negative phrases and positive phrases may be associated using machine learning, natural language processing or cognitive computing. Further, the identification of positive and negative phrases may include the use of machine learning, natural language processing or cognitive computing. In a non-limiting embodiment, the machine learning may include a neural network. With the neural network, training data such as the manually generated associates is applied to the neural network to determine similar or close phrases. In an embodiment, cognitive computing is the simulation of human thought processes in a computerized model. Cognitive computing may also involve self-learning systems that use data mining, pattern recognition and natural language processing to mimic the way the human brain works.

Figure 7:
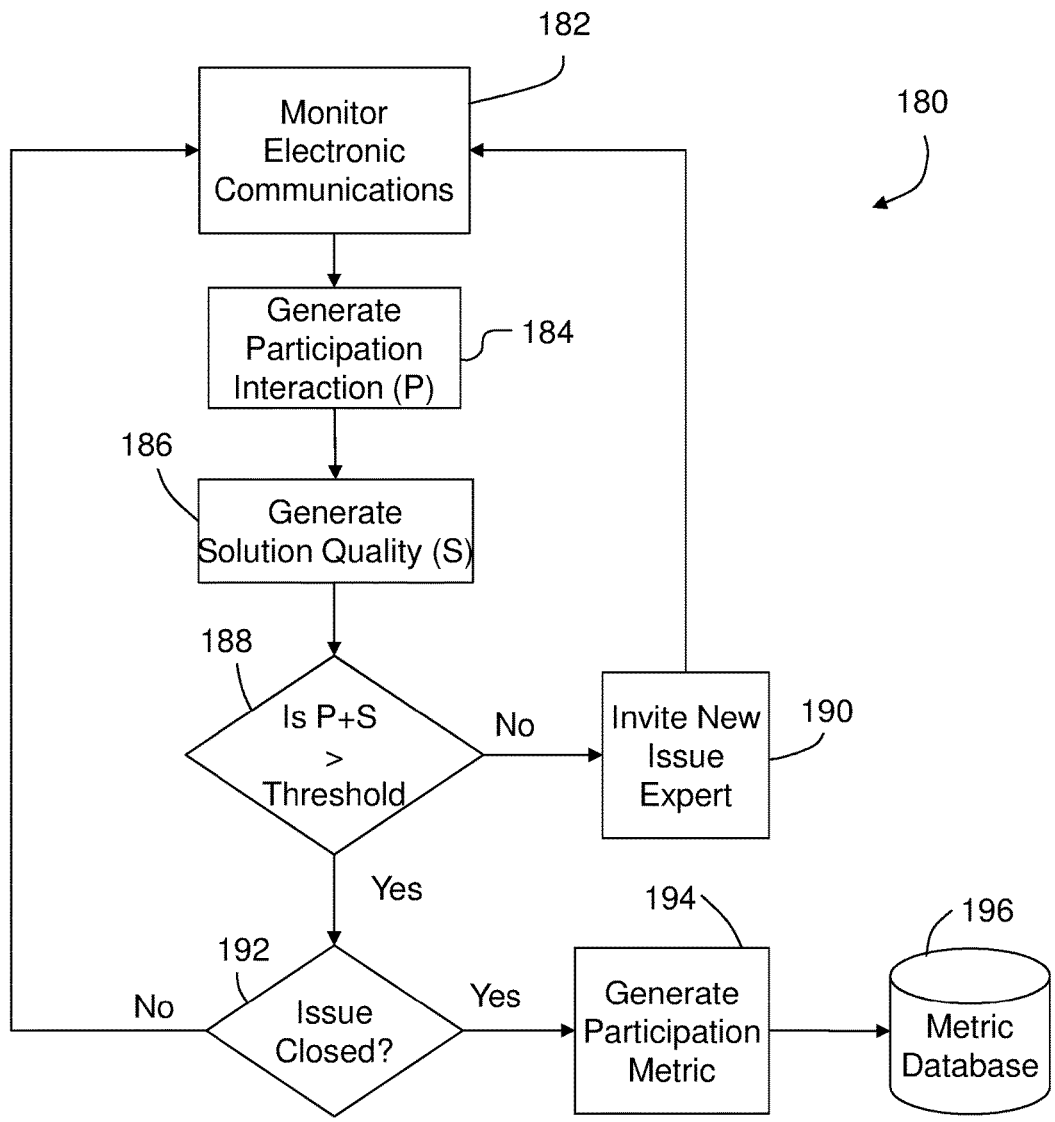
FIG. 7 depicts a flow diagram of a method for assessing the performance of an online collaboration, according to some embodiments of this disclosure.

Referring now to FIG. 7, another method 180 is shown for using the participation interaction parameter and solution quality parameter to monitor the performance of the online collaboration and determine when additional assistance is needed. The method 180 starts in block 182 by monitoring the electronic communications between the participants of the online collaboration. The monitoring of electronic communications may include the use of machine learning, natural language processing or cognitive computing. The method 180 proceeds to block 184 where a participation interaction parameter is determined based at least in part on the electronic communications. In the exemplary embodiment, the participation interaction parameter includes an accountability factor and a collaboration dynamics factor. The method 180 then proceeds to block 186 where a solution quality parameter is determined based at least in part on the electronic communications.

The method 180 then proceeds to block 188 where it is determined if the sum of the participation interaction parameter and solution quality parameter is greater than a threshold. The threshold is a value which is used to determine when the participants are progressing towards closure of the open issue. When the query block returns a negative, the method 180 proceeds to block 190 where a new participant or expert is invited. In one embodiment, the method 180 uses a process similar to that described in FIG. 4 to identify the new participant or expert. In an embodiment, the method 180 proceeds through a ranked list of individuals identified based on a composite score (FIG. 5). When the new participant accepts the invitation, the method 180 loops back to block 182. In an embodiment, the monitoring of participation activity could also reveal that the collaborators need additional help based on the analysis of the collaboration stream, for example a participant may say 'we are not making good progress, we need someone from Development who can help with thermal imaging, to close this heatsink issue'. In still another embodiment, the amount of time a collaborative team has been at a particular stage or status may indicate that additional participants may be needed and the method proceeds to invite an additional participant.

When query block 192 returns a positive, meaning the sum of the participant interaction parameter and solution quality parameter is greater than a threshold, then the method 180 proceeds to query block 192. In query block 192 it is determined whether the open issue has been resolved. As discussed herein, the determination of the resolution of the issue may be determined automatically based on the identification of keywords or phrases in the electronic communications. In other embodiments, the participants of the online collaboration may manually designate the issue as being closed. In one embodiment, the sum of the participation interaction parameter and the quality solution are iteratively assessed and when the sum is above a threshold, the issue is deemed resolved. This embodiment could be used to prevent "over engineering" a solution or "gold plating" and it is in line with Agile and Lean methodologies.

When the query block 192 returns a negative (e.g. issue unresolved), the method 180 loops back to block 182. When query block 192 returns a positive (e.g. issue resolved), the method 180 proceeds to block 194 where participant metrics are generated, such as the accountability factor, the collaboration dynamics factor, and the velocity factor for example. These factors are then stored in a database for each individual in block 196.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory having computer readable instructions; and
one or more processors for executing the computer readable instructions, the computer readable instructions comprising:
on an electronic platform providing for an exchange of messages among multiple participants, identifying at least one open issue to be resolved;
collecting, by a processor of the one or more processors, data from the exchange of messages to determine a participation interaction parameter and a solution quality parameter associated with the at least one open issue, wherein the participation interaction parameter includes an accountability dynamic factor and collaboration dynamic factor and the solution quality parameter includes a velocity factor, a dormancy factor, and an extinction factor;
when a sum of the participation interaction parameter and the solution quality parameter is below a threshold value, indicating that the multiple participants are not progressing towards closure of the open issue to be resolved, automatically transmitting, by the processor, an invitation to at least one open issue participant to the electronic platform providing for the exchange of messages on the at least one open issue, the at least one open issue participant not one of the multiple participants,
wherein the at least one open issue participant is selected based at least is part on filtering, by the processor, a database of available participants to define a subset of available participants having technical skills related to the open issue, and selecting, by the processor, the at least open issue participant from the subset; and
determining when the at least one open issue becomes a closed issue.

2. The system of claim 1 wherein the at least one open issue participant is selected further based at least in part on generating a list of a plurality of open issue participants, each open issue participant of the plurality of open issue participants having an associated participant solution quality parameter, the associated participant solution quality parameter including a participant velocity factor, a participant dormancy factor and a participant extinction factor.

3. The system of claim 2 wherein the computer readable instructions further comprise ordering the plurality of open issue participants in a ranked order, the ranked order based at least in part on the associated participant solution quality parameter.

4. The system of claim 3 wherein each of the plurality of open issue participants includes a participant participation interaction parameter, the participant participation interaction parameter including a participant accountability dynamic factor and a participant collaboration dynamic factor.

5. The system of claim 1 wherein the computer readable instructions further comprise storing the participation interaction parameter and the solution quality parameter as a participant participation interaction parameter and a participant solution quality parameter for each of the multiple participants.

6. The system of claim 1 wherein the determining of the participation interaction parameter includes using phrase identification in the exchange of messages using natural language processing.

7. The system of claim 1 wherein the collecting data from the exchange of messages enables unilaterally provisioning computing capabilities to determine the participation interaction parameter and the solution quality parameter associated with the at least one open issue.

8. A computer program product comprising a non-transitory computer readable storage medium having program instructions embodied therewith, the program instructions executable by a processor to cause the processor to perform:
on an electronic platform providing for an exchange of messages among multiple participants, identifying at least one open issue to be resolved;
collecting, by the processor, data from the exchange of messages to determine a participation interaction parameter and a solution quality parameter associated with the at least one open issue, wherein the participation interaction parameter includes an accountability dynamic factor and collaboration dynamic factor and the solution quality parameter includes a velocity factor, a dormancy factor, and an extinction factor;
when a sum of the participation interaction parameter and the solution quality parameter is below a threshold value, indicating that the multiple participants are not progressing towards closure of the open issue to be resolved, automatically transmitting, by the processor, an invitation to at least one open issue participant to the electronic platform providing for the exchange of messages on the at least one open issue, the at least one open issue participant not one of the multiple participants,
wherein the at least one open issue participant is selected based at least is part on filtering, by the processor, a database of available participants to define a subset of available participants having technical skills related to the open issue, and selecting, by the processor, the at least open issue participant from the subset; and
determining when the at least one open issue becomes a closed issue.

9. The computer program product of claim 8 wherein the at least one open issue participant is selected further based at least in part on generating a list of a plurality of open issue participants, each open issue participant of the plurality of open issue participants having an associated participant solution quality parameter, the associated participant solution quality parameter including a participant velocity factor, a participant dormancy factor and a participant extinction factor.

10. The computer program product of claim 9 further comprising ordering the plurality of open issue participants in a ranked order, the ranked order based at least in part on the associated participant solution quality parameter.

11. The computer program product of claim 10 wherein each of the plurality of open issue participants includes a participant participation interaction parameter, the participant participation interaction parameter including a participant accountability dynamic factor and a participant collaboration dynamic factor.

12. The computer program product of claim 8 further comprising storing the participation interaction parameter and the solution quality parameter as a participant participation interaction parameter and a participant solution quality parameter for each of the multiple participants.

13. The computer program product of claim 8 wherein the determining of a participation quality parameter includes using phrase identification in the exchange of messages using cognitive computing.

* * * * *